Sept. 18, 1923.  H. C. THOMPSON, JR  1,468,051
STORAGE BATTERY
Filed Aug. 26, 1921    4 Sheets-Sheet 3

Inventor
H.C.Thompson, Jr.
By Lacey & Lacey, Attorneys

Sept. 18, 1923.

H. C. THOMPSON, JR
STORAGE BATTERY
Filed Aug. 26, 1921

Inventor

H. C. Thompson Jr.

By Lacey & Lacey, Attorneys

Patented Sept. 18, 1923.

1,468,051

UNITED STATES PATENT OFFICE.

HENRY C. THOMPSON, JR., OF ST. LOUIS, MISSOURI.

STORAGE BATTERY.

Application filed August 26, 1921. Serial No. 495,490.

*To all whom it may concern:*

Be it known that I, HENRY C. THOMPSON, Jr., a citizen of the United States, residing at St. Louis in the State of Missouri, have invented certain new and useful Improvements in Storage Batteries, of which the following is a specification.

This invention relates to improvements in storage batteries. The ordinary storage battery as usually constructed is subject to deterioration from the action of the electrolyte and when the battery becomes thus damaged it is necessary to tear the same apart, replace the corroded parts, and again build up the structure. It is therefore the primary object of the present invention to provide a storage battery which will not be subject to deterioration to the same extent as the ordinary battery and which will therefore not require to be frequently repaired or rebuilt.

Another object of the invention is to provide, in a storage battery, a novel construction of cover for the battery jar which may be effectually sealed and which at the same time may be readily removed and replaced whenever it becomes necessary to gain access to the interior of the battery for the purpose of making repairs or inspecting the condition thereof.

Another object of the invention is to provide novel means for supporting the positive and negative plates in such a manner as to preclude any likelihood of short circuiting of the battery due to accumulations settling to the bottom of the jar, the means being adapted to support the plates in such manner that their lower edges will be spaced above the bottom of the jar a sufficient distance to be kept clear of such accumulations.

Another object of the invention is to provide upon the walls of the jar, means for mutually separating and properly spacing the positive and negative plates so as to thereby obviate the employment of separators as has heretofore been necessary.

Figure 1:
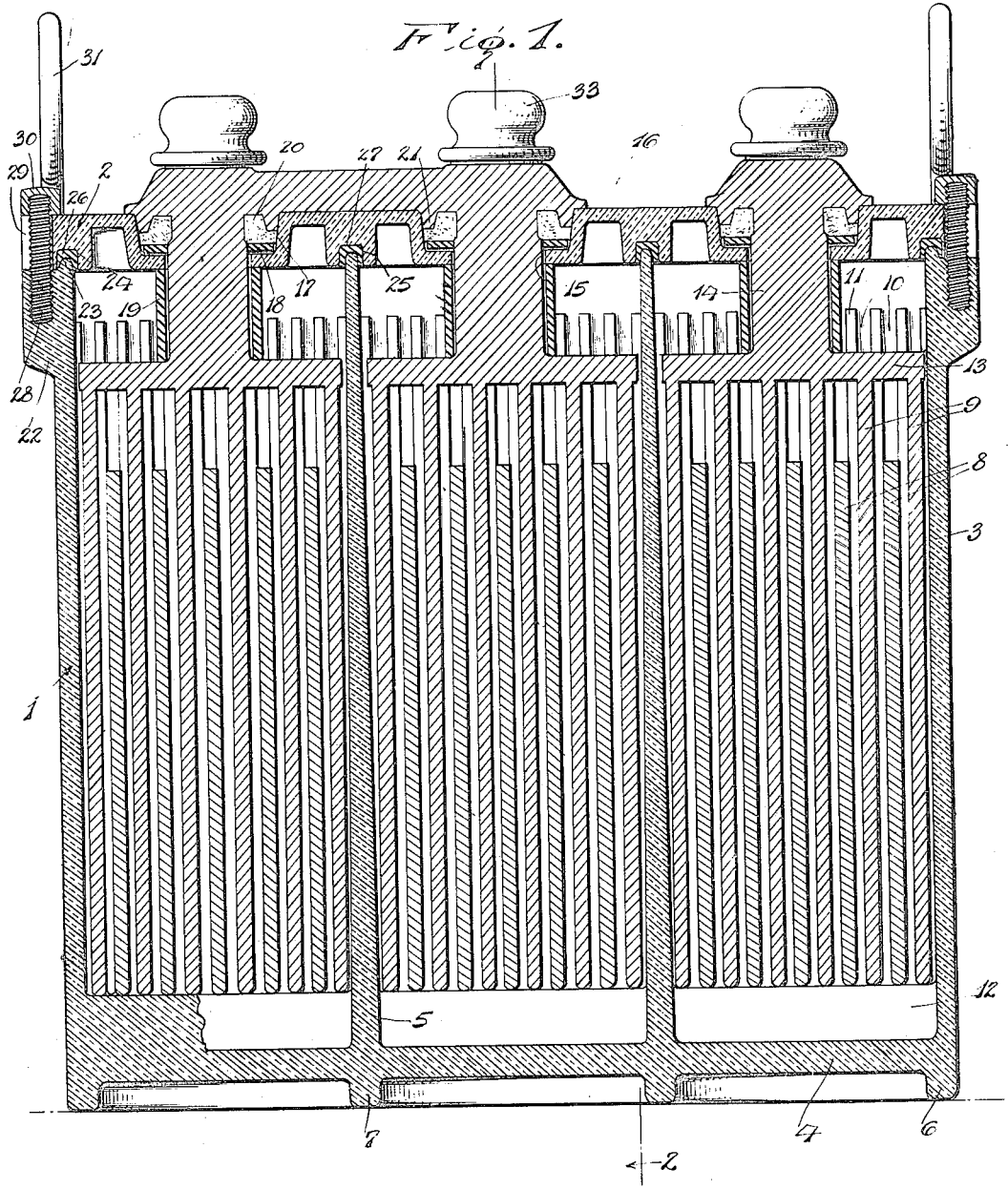
Figure 1 is a vertical longitudinal sectional view through a battery constructed in accordance with the present invention.

In the drawings the battery jar is indicated in general by the numeral 1 and the lid or cover therefor by the numeral 2. Both of these parts are preferably formed from porcelain, porcelain enameled metal, or some other similar material which is acid proof and otherwise suitable for the purpose. The jar 1 comprises side walls 2', end walls 3, a bottom 4, and partition walls 5 which upstand from the bottom 4 and extend transversely between the side walls 2' and which have their upper edges located substantially in the plane of the upper edges of the side and end walls 2' and 3. Preferably the bottom 4 of the jar is provided with a marginal bead 6 and with beads 7 located below and opposite the lower edges of the partition walls 5. The beads 6 and 7 reinforce the bottom 4 and permit of the jar being firmly supported without likelihood of breakage of its bottom through contact with uneven surfaces. The partition walls 5 of course divide the interior of the jar 1 into compartments in which the positive and negative plates are supported and the electrolyte is contained, a group of said plates being supported within each of said compartments.

Figure 2:
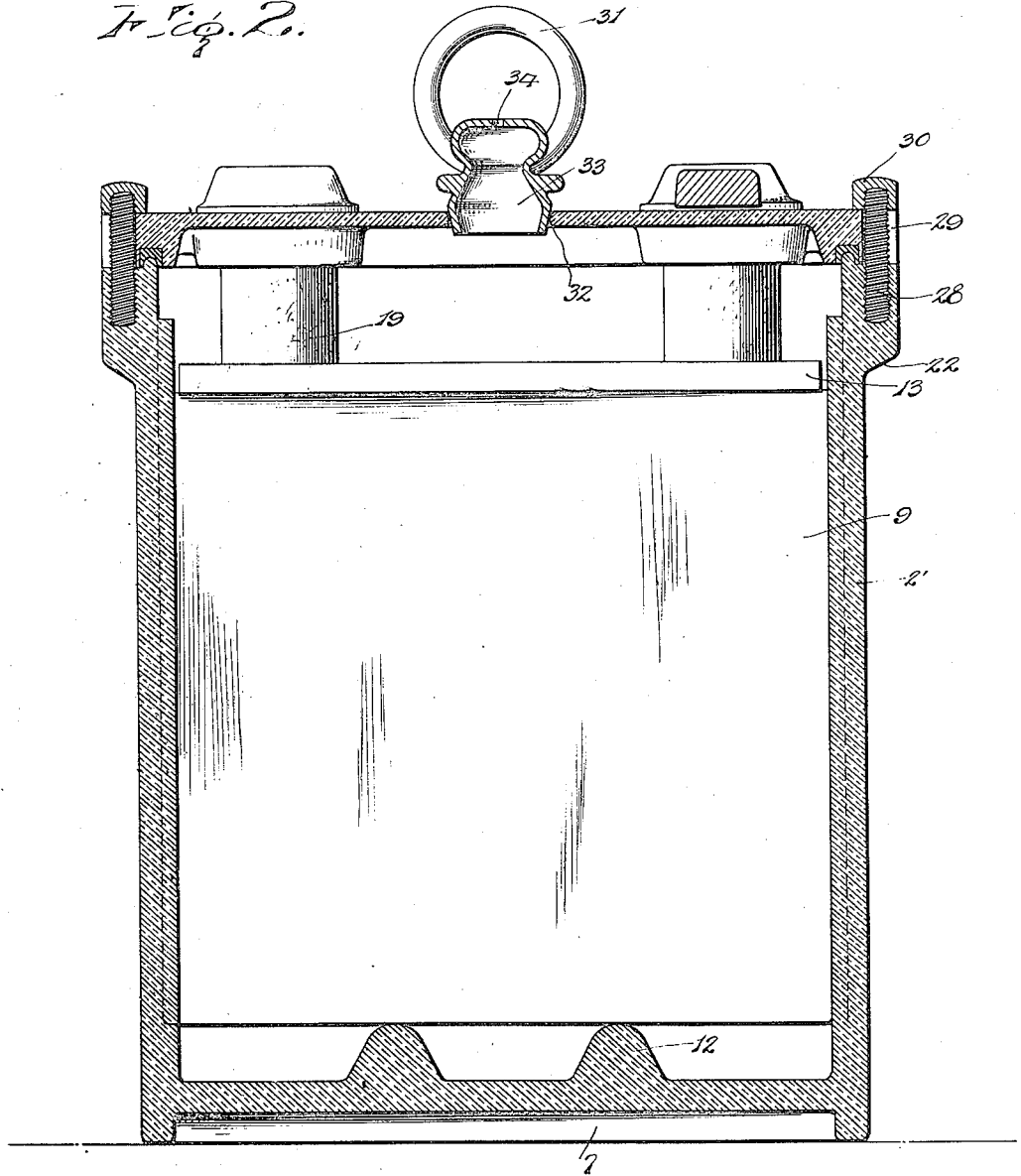
Figure 2 is a vertical sectional view taken substantially on the line 2—2 of Figure 1 looking in the direction indicated by the arrows.
Figure 3:
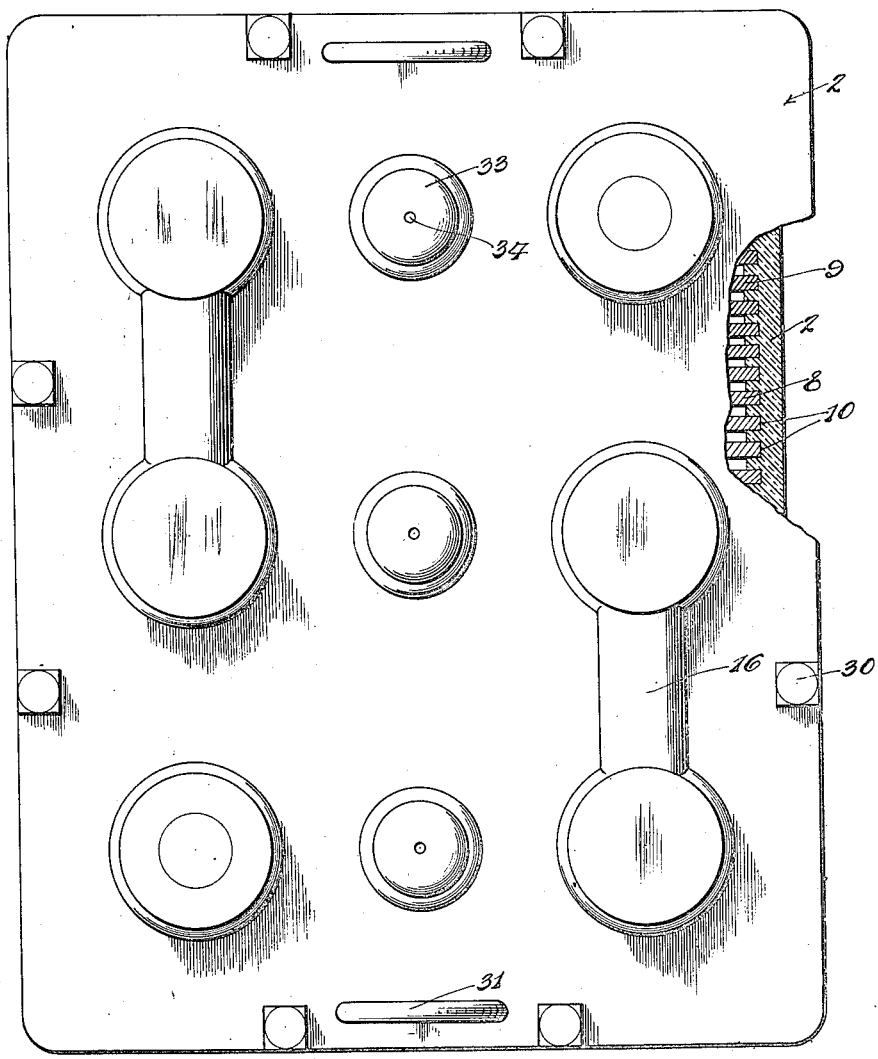
Figure 3 is a top plan view of the battery, a part of the cover being broken away and other parts being shown in horizontal section.
Figure 4:
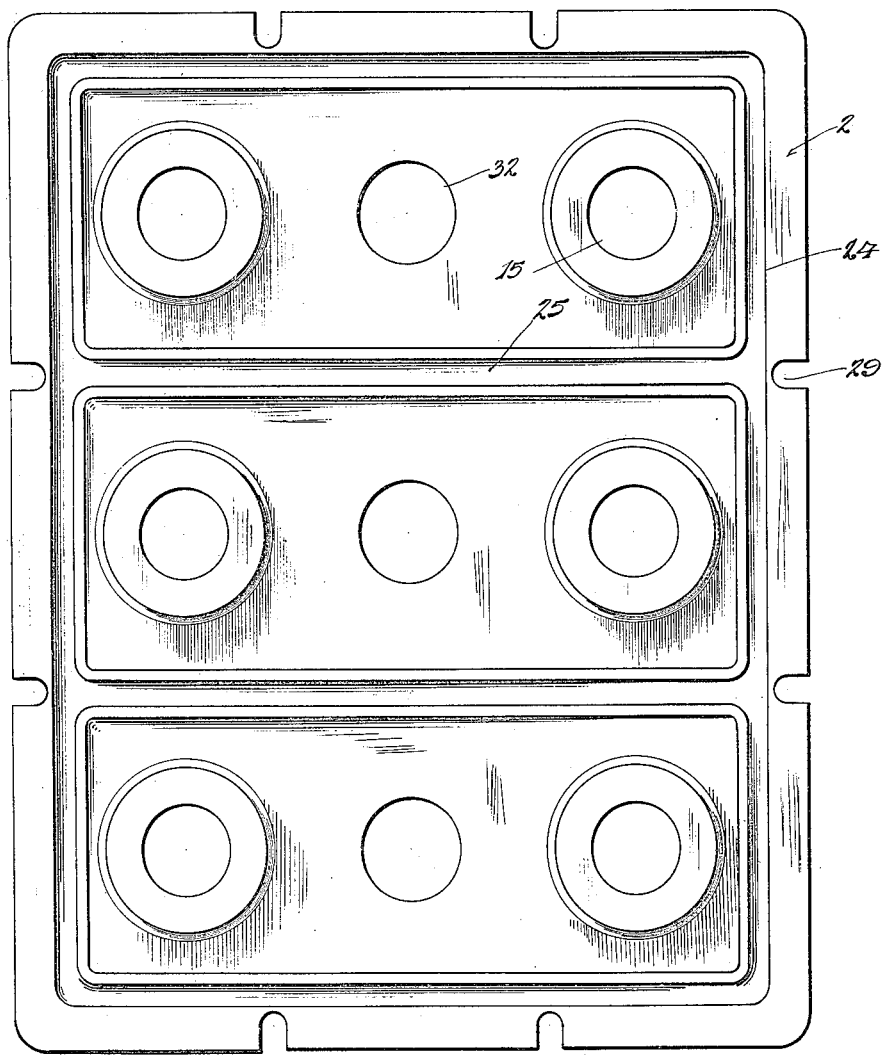
Figure 4 is a bottom plan view of the cover of the battery jar.

The positive and negative plates above referred to are indicated respectively by the numerals 8 and 9 and these plates are seated at their vertical edges in grooves 10 provided upon the inner sides of the opposite side walls 2' of the jar by the formation of parallel ribs 11 upon the said walls. In this manner the positive and negative plates of each group are properly spaced and maintained mutually separated without the employment of the usual separators which possess numerous disadvantages. In order that the plates may be supported with their lower edges somewhat spaced above the bottom 4 of the jar and thus out of contact with any accumulations in the bottom of the jar which would tend to short circuit the battery, one or more upstanding ribs 12 is formed upon the upper side of the bottom 4 of the battery jar within each of the compartments thereof, and the lower edges of the plates 8 and 9 rest upon these ribs as will be evident by reference to Figures 1 and 2 of the drawings. The plates 9 of each group are electrically and mechanically connected by a head 13 preferably integral with the upper edges thereof as shown in Figure 1 of the drawings, each of these heads 13 being provided with an upstanding post 14.

The cover 2 of the jar is formed with a plurality of openings 15 to accommodate the posts 14, and these posts are electrically connected in proper order by lead connectors 16 which extend above the cover 2. Each opening 15 is surrounded by a seating recess 17 within which is received a rubber washer or gasket 18 snugly fitting the upper portion of the respective post 14, the gasket 18 seating upon the upper side of the bottom of the seating recess 17 and, by its snug engagement with the post 14, sealing the opening 15 in a liquid tight manner. A collar 19 of rubber or any other material found suitable for the purpose is fitted about the lower portion of the upstanding post 14 and rests at its lower end upon the upper side of the respective head 13 and at its upper end engages against the under side of the cover 2 about the respective opening 15. These collars 19 serve to prevent any upward displacement of the posts with relation to the cover 2. The numeral 20 indicates a filling of asphalt or any other suitable material which is packed within each of the seating recesses 17 about the upper end of the post 14 and between the gasket 18 and the under side of the lead connector 16, the lead connector being preferably provided upon its under side with an annular depending flange 21 seating within the respective recess 17 and embedded in the filling 20.

In order that a fluid tight connection may be provided between the cover 2 and the upper edges of the walls of the jar upon which it is disposed, and in order that the said cover may be normally securely clamped to the jar but readily and conveniently removed whenever occasion requires, the upper edge portions of the walls 2' and 3 of the jar are somewhat thickened as indicated by the numeral 22 and each is formed with an upstanding bead 23 designed to be accommodated within a groove or channel 24 formed in the under side of the cover 2, the upper edges of the partition walls 5 being accommodated within grooves or channels 25 also formed in the under side of the said cover 2. Packing gaskets 26 and 27 are arranged within the grooves 24 and 25 respectively, and the bead 23 and the upper edges of the partition walls 5, embedded in these gaskets when the cover 2 is clamped in place upon the jar. The cover is secured in place by providing threaded studs 28 at suitable intervals upon the upper edges of the walls 2' and 3 of the jar, the lower end portions of these studs being permanently embedded in the thickened portions 22 of the said walls, and the projecting upper portions of the studs being received within notches 29 formed at correspondingly located points about the margin of the cover 2. Cap nuts 30 are removably fitted onto the projecting upper ends of the studs 28 and may be tightened to bear against the upper side of the cover 2 to bind the same in place. Handles 31 are preferably provided upon the upper side of the cover at the ends thereof so as to permit of the cover being readily lifted from the jar when the nuts 30 are removed.

The cover 2 is formed at suitable intervals, preferably at a point above each of the compartments within the jar, with openings 32 into which are removably fitted vent plugs 33 each provided in its top with a vent opening 34.

Having thus described the invention what is claimed as new is:

In a secondary battery, a jar comprising side and end walls, a bottom, and partition walls, the partition walls providing a plurality of compartments, the side walls of the jar having series of vertical grooves within each of said compartments, plates of opposite polarity removably fitted at their vertical edges in alternate ones of the grooves and arranged in groups in the several compartments, heads connecting the tops of the plates of each kind in a group, a lid disposed upon the top of the jar and having openings therein above the several compartments, posts upstanding from the several heads and extending upwardly through the openings, connectors extending between the posts and above the said lid, the said lid being provided in its upper side with a seating recess surrounding each of the post openings, and a packing in each of said recesses, the posts being provided at their upper portions with surrounding depending flanges embedded in the packings in the respective recesses.

In testimony whereof I affix my signature.

HENRY C. THOMPSON, Jr. [L. S.]